United States Patent [19]

Bock et al.

[11] 4,447,025
[45] May 8, 1984

[54] CARRIER FOR A DROPLOAD TO BE DROPPED FROM AN AIRCRAFT

[75] Inventors: Siegfried Bock, Kirchseeon; Horst Huetter, Tegernsee, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 402,563

[22] Filed: Jul. 28, 1982

[30] Foreign Application Priority Data

Aug. 14, 1981 [DE] Fed. Rep. of Germany ....... 3132190

[51] Int. Cl.³ .............................................. B64D 1/02
[52] U.S. Cl. .................................. 244/118.2; 244/137 R; 244/3.28
[58] Field of Search ............. 244/118.2, 137 R, 137 A, 244/138 R, 120.2, 3.1, 3.24, 3.27, 3.28; 89/1.5 R, 1.5 C, 1.5 G

[56] References Cited

U.S. PATENT DOCUMENTS

| | | | |
|---|---|---|---|
| 2,876,677 | 3/1959 | Clark et al. | 89/1.5 R |
| 2,992,794 | 7/1961 | Boyd | 244/14 |
| 3,468,501 | 9/1969 | Baum | 244/3.1 |
| 3,547,000 | 12/1970 | Haberkorn | 244/137 A |
| 4,208,949 | 6/1980 | Boilsen | 244/137 A |
| 4,265,416 | 5/1981 | Jackson et al. | 244/2 |
| 4,296,894 | 10/1981 | Schnäbele et al. | 244/3.27 |

FOREIGN PATENT DOCUMENTS

| | | |
|---|---|---|
| 2311433 | 2/1976 | Fed. Rep. of Germany . |
| 2740318 | 3/1978 | Fed. Rep. of Germany . |
| 2758231 | 7/1978 | Fed. Rep. of Germany . |
| 2156974 | 9/1979 | Fed. Rep. of Germany . |
| 793927 | 4/1958 | United Kingdom . |

OTHER PUBLICATIONS

"Soldat und Technik" Nr. 7/1976, p. 371.

*Primary Examiner*—Trygve M. Blix
*Assistant Examiner*—Ivy M. Shum
*Attorney, Agent, or Firm*—W. G. Fasse; D. H. Kane, Jr.

[57] ABSTRACT

A load such as supply containers, weapons or the like is dropped from an aircraft by a carrier which has a longitudinal support beam and wings which are hinged to the support beam to normally extend in the direction of the longitudinal support beam when the load is secured to the aircraft through the support beam. Once the beam with the load attached thereto is released from the aircraft the wings are automatically spread out for controlling the flight of the load to the ground. The longitudinal carrier or the load itself may be equipped with a propulsion system that may be controlled automatically by control means forming part of the load or it may be controlled by remote control.

4 Claims, 1 Drawing Figure

U.S. Patent May 8, 1984 4,447,025
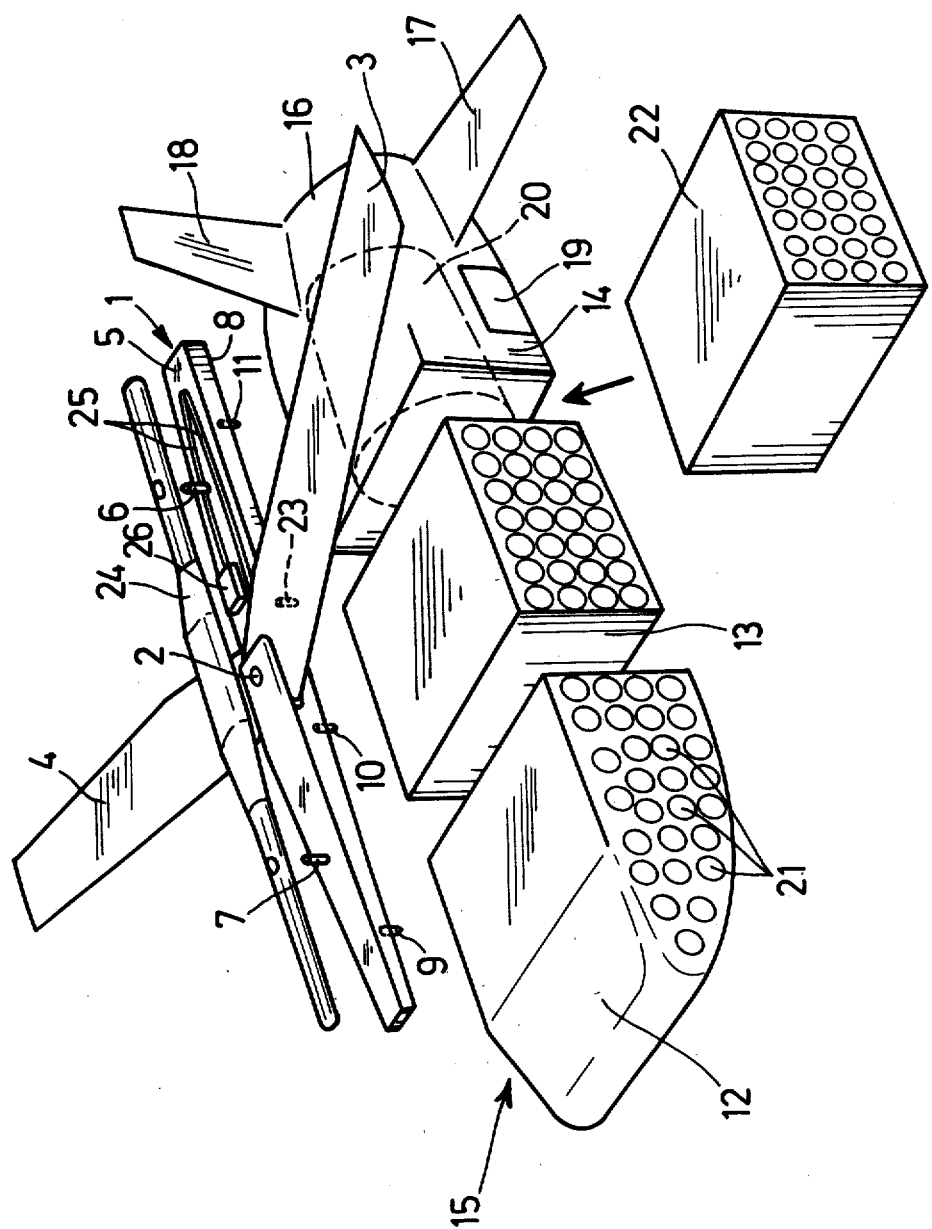

CARRIER FOR A DROPLOAD TO BE DROPPED FROM AN AIRCRAFT

CLAIM TO PRIORITY

The present application is based on German Ser. No. P 31 32 190.9-22, filed in the Federal Republic of Germany on Aug. 14, 1981. The priority of the German filing date is claimed for the present application.

BACKGROUND OF THE INVENTION

The present invention relates to a carrier for a dropload to be dropped from an aircraft. Such carriers are known in the art generally for the purpose of securing and releasing of droppable loads to or from an aircraft. Such loads may comprise weapons and/or supplies. Weapons droppable from an aircraft may comprise scattering weapon containers such as cluster bombs transport containers, flying bodies such as rockets, bombs and the like. According to the prior art it is generally not possible to further influence the descent of the dropped loads once the release or separation between the dropload and the aircraft has taken place. In order to control the descent of the dropload the carrier for the dropload must be equipped and/or constructed for such control purposes.

German Patent Publication (DE-OS) No. 2,740,318 and German Patent Publication (DE-OS) No. 2,758,231 disclose a carrier mechanism for droploads, whereby the carrier mechanism is permanently secured to an aircraft. This type of carrier, however, is not suitable for the descent control of the load.

German Patent Publication (DE-AS) No. 2,311,433 discloses an outboard container, the dimensions of which are variable. The container has a central portion which is suspended from an outboard carrier which in turn is rigidly connected to the aircraft.

German Patent Publication (DE-OS) No. 2,156,974 discloses a scattering weapons container equipped for an automatic control and provided with its own propulsion system. However, the container itself is separably secured to suspension eyes. These suspension eyes are not separable from the aircraft.

All of these prior art carrier systems in the form of release or launching devices, outboard carriers or suspension eyes secured to the aircraft body for the droploads have the common feature that they are a fixed component of the aircraft and cannot be separated from the aircraft when the aircraft is flying a mission.

It is a further common feature of these prior art structures that it is not possible to exert any kind of influence on the dropload after the dropload has been separated from the aircraft.

OBJECTS OF THE INVENTION

In view of the above it is the aim of the invention to achieve the following objects singly or in combination:

to provide a carrier mechanism or system for a dropload which makes it possible to drop the carrier together with the load during a mission or to drop the load from the carrier first and to then also drop the carrier if desired;

to influence and/or control the range and/or target approach of the dropload and carrier after its release from an aircraft;

to provide a dropload carrier which together with the load is capable of traversing substantial distances as a flying body together with the load under remote or automatic control; and to release the dropload from the carrier after the carrier itself has been released from the aircraft or when the carrier is still secured to the aircraft.

SUMMARY OF THE INVENTION

According to the invention there is provided a carrier mechanism for a dropload to be secured to an aircraft comprising a longitudinal carrier body extending along the dropload and along the aircraft body and having releasable connections to the aircraft body as well as to the dropload. Further, the carrier body is equipped with hinged wings.

The releasable connections between the carrier body and the aircraft and between the load and the carrier body are of conventional construction. One or a plurality of individual load containers are secured to the downwardly extending suspension or securing means for the load.

Preferably the downwardly extending load holding suspension or securing means are adapted for releasably holding a tail unit and/or electronic control means for a propulsion system which may be secured to the carrier body or to the load or a portion of the load, whereby the propulsion unit and the electronic control means are constructed as individual containers or container components. These container or container components with the electronic control means and/or the propulsion system are preferably arranged at the tail end and/or at the nose end of the carrier body. The carrier body may simultaneously be equipped with releasable further suspension means for holding at least one individual container constructed for holding scattering or clustering weapons.

Preferably, the carrier body is equipped with a channel member forming a cover which encloses all connecting ducts and electrical conductors between the aircraft and the dropload as well as between the individual containers of the dropload. Further, the channel type cover member also encloses the hinge bearings for the hinged wings and the drive means for unfolding the wings.

BRIEF FIGURE DESCRIPTION

In order that the invention may be clearly understood, it will now be described, by way of example, with reference to the accompanying drawings, wherein the single FIGURE illustrates a schematic, perspective view of the carrier system and dropload according to the invention.

DETAILED DESCRIPTION OF A PREFERRED EXAMPLE EMBODIMENT AND OF THE BEST MODE OF THE INVENTION

A box type longitudinal carrier body 1 of a carrier system or carrier flying craft according to the invention is equipped with foldable wings 3 and 4 secured or rather, hinged to the carrier body 1 by hinging means 2, the details of which are of conventional construction. The upwardly facing side 5 of the carrier body 1 is provided with conventional first securing or suspending means 6 and 7 for suspending the carrier body in a releasable manner to the underbelly side of an aircraft not shown. The first securing or suspension means 6 and 7 may, for example, comprise conventional explodable screws or rivets Second suspension or securing means 9, 10, and 11 also, for example, in the form of explodable rivets or screws are secured to the underside 8 of the carrier body 1 for the releasable and individual suspension of a dropload 15 which may, for example, comprise a plurality of individual containers 12, 13 and 14.

One of the individual containers, for example 14, the tail end of the longitudinal carrier body 1 is constructed as a tail unit 16 equipped with elevator flaps 17 and rudder flaps 18. An electronic control means 19 such as a conventional autopilot may also be installed in the tail unit 16. Further, the tail unit 16 may carry a propulsion system 20 and/or scattering or clustering weapons 21. The propulsion system may be secured, in the alternative, directly to the longitudinal carrier body 1 rather than forming a droppable container or container portion.

In an alternative embodiment it is possible to install in an aerodynamically shaped nose cone forming an individual container 12, the scattering or clustering weapons 21 and/or a steering assembly in the form of elevator and/or rudder flaps not shown in the FIGURE. Such a structure would form a conventional canard type steering unit carrying the control means 19 and a propulsion system 20. The scattering weapons 21 in at least some of the containers extend perpendicularly to the longitudinal axis or plane of the carrier flying craft.

An individual container 13 may serve as a scattering or clustering weapons carrier. Depending on the size of the individual containers or container components it is possible to provide an additional suspension means 23 for carrying a further individual container 22 for the same purpose or for other purposes, whereby the individual container 22 would be arranged between the carrier body 1 and the individual containers 13 and 14 or 12 and 13 as a slide-in member.

A channel member 24 forming simultaneously a cover is securable to the top side 5 of the longitudinal carrier body 1. The channel or cover member 24 encloses all the connecting conduits and electrical conductors between the aircraft not shown in the drawing and the dropload 15. The cover member or channel member 24 also encloses the conduits or connecting conductors 25 between the individual containers 12, 13, 14 and 22 as well as the conventional hinging or bearing means for the wings 3, 4 and also the unfolding drive means 26 such as a spring motor for extending or unfolding these wings 3, 4.

The system according to the invention operates as follows. Due to the first suspension means 6, 7 for suspending the carrier body from an aircraft and due to the second suspension means 9, 10, 11 for suspending the dropload from the carrier body, it is possible to either separate the carrier body with the load from the aircraft or to separate the dropload 15 from the carrier body depending on the instantaneous requirements.

Due to the above described features including the hingeable wings 3, 4 secured to the carrier body 1 and the propulsion system 20 with the electronic control 19 and the tail unit 16, it is possible to influence the descent flight of the carrier body and load after separation from the aircraft. Thus, the invention increases the target hitting accuracy as well as the operational range of such droploads 15.

Further advantages of the invention are seen in that, for example, in scattering or clustering types of weapons the system is greatly adaptable to the individual requirements, depending on available and usable equipment and individual containers forming the dropload. The carrier system with its tiltable or extendable wings 3, 4 may be operated as a controllable, self-propelled flying body having a large operational range and target accuracy. The system may be further operated as a controlled or non-controlled sail bomb without its own propulsion. When the wings 3, 4 are extending in the longitudinal direction of the carrier body, the system may be used as a controlled or uncontrolled rocket with its own propulsion. The system may then also be used as a drop bomb or as a body suitable for performing similar functions.

It is further possible to operate the present system due to its disclosed structure, by separating the individual containers or all containers from the carrier body, whereby the latter remains secured to the aircraft for a later renewed use. In such an instance, however, it is possible to drop the carrier body itself from the aircraft in a rapid manner if that should be necessary, for example, in a danger or emergency situation. Since the nose portion of the dropload is formed as an aerodynamically shaped container 12 it is possible to keep that portion connected to the carrier body until after all the individual containers have already been dropped. Thus, the nose cone container portion 12 may be equipped with electronic control means as well as with a canard type steering unit. It may also carry a propulsion system and/or scattering weapons 21, whereby the nose cone portion may continue to travel by itself or still connected to the carrier body. Additionally, the invention is also suitable for use in connection with supply containers carrying supplies and weapons not of the scattering type. As shown, the separate load carrying members 12, 13, 22 have cavities extending at right angles to the longitudinal central axis or plane of the carrier flying craft, whereby the scattering weapons 21 also extend at a right angle to the longitudinal axis of the flying craft formed by the carrier body 1 and the load container members 12, 13 and 22. Thus, these weapons 21 may be discharged laterally away from both side of the so formed carrier flying craft.

Although the invention has been described with reference to specific example embodiments, it will be appreciated, that it is intended, to cover all modifications and equivalents within the scope of the appended claims.

What is claimed is:

1. A carrier flying craft for a dropload to be dropped from an aircraft, comprising a longitudinal carrier body (1), first securing means (6, 7) for releasably connecting said carrier body to an aircraft, a plurality of separate dropload members (12, 13, 14), second securing means (9, 10, 11) for releasably connecting said dropload members (12, 13, 14) to said carrier body (1) for forming a carrier body load combination constituting said flying craft, wing means (3, 4) and hinge means (2) including unfolding drive means (26) for operatively connecting said wing means to said carrier body for holding the wing means substantially in longitudinal alignment with the carrier body when the carrier body is secured to an aircraft and for unfolding said wing means when the carrier body is released from an aircraft, whereby the flight of a load to the ground is controllable, said carrier flying craft further comprising propulsion means (20) forming part of the carrier body load combination, tail unit means (16) forming part of the carrier body load combination, electronic autopilot means (19) operatively connected for controlling the operation of said tail unit means, wherein said tail unit means comprise rudder flap means (18) and elevator flap means (17) for steering the carrier body load combination during its descent flight by said electronic autopilot means, and wherein one of said dropload members forms an aerodynamically shaped nose cone member (12) which is longitudinally spaced from said tail unit means to provide intermediate space for at least one further dropload member (13, 22), at least one of said dropload members having cavities for receiving scattering weapons (21), said cavities extending substantially at right angles to a longitudinal axis of said carrier flying craft for scattering weapons (21) laterally away from said carrier flying craft.

2. The carrier flying craft of claim 1, wherein said longitudinal carrier body comprises a longitudinal channel member (24) and connecting conductor means (25) covered by said channel member (24) for providing operative connections between an aircraft and the carrier flying craft and between the carrier body and individual dropload members.

3. The carrier flying craft of claim 2, wherein said unfolding drive means (26) are installed in said channel means, said unfolding drive means being connected to said wing means for unfolding the wing means automatically when a load is being dropped.

4. The carrier flying craft of claim 2, wherein said hinge means (2) are also enclosed by said channel means.

* * * * *